United States Patent [19]

Yabe

[11] Patent Number: 5,638,673
[45] Date of Patent: Jun. 17, 1997

[54] METHOD AND APPARATUS USING HYDROGEN-OCCLUDED ALLOY FOR RECOVERING POWER FROM WASTE HEAT

[75] Inventor: Akira Yabe, Tsukuba, Japan

[73] Assignee: Agency of Industrial Science & Technology, Ministry of International Trade & Industry, Tokyo, Japan

[21] Appl. No.: 584,470

[22] Filed: Jan. 11, 1996

[30] Foreign Application Priority Data

Jan. 10, 1995 [JP] Japan ................................. 7-018448

[51] Int. Cl.⁶ .................................................. F01K 25/06
[52] U.S. Cl. ......................................... 60/649; 60/673
[58] Field of Search ................................. 60/649, 673

[56] References Cited

U.S. PATENT DOCUMENTS

| | | | |
|---|---|---|---|
| 4,198,827 | 4/1980 | Terry et al. | 60/649 |
| 4,358,931 | 11/1982 | Terry et al. | 60/649 |
| 4,397,153 | 8/1983 | Terry et al. | 60/649 |
| 4,537,031 | 8/1985 | Terry et al. | 60/649 |

*Primary Examiner*—Ira S. Lazarus
*Assistant Examiner*—Alfred Basichas
*Attorney, Agent, or Firm*—Oblon, Spivak, McClelland, Maier & Neustadt, P.C.

[57] ABSTRACT

An apparatus for a method using hydrogen-occluded alloy for recovering power from waste heat includes first and second heat exchangers containing hydrogen-occluded alloy, a first selector valve for alternating introduction of waste heat fluid between the first and second heat exchangers, a second selector valve for alternating introduction of cooling fluid between the first and second heat exchangers, a turbine associated with the heat exchangers, and a power generator connected to the turbine. The hydrogen-occluded alloy in the first and second heat exchangers is in the form of a multiplicity of stages that release the hydrogen gas at different temperatures, with the hydrogen gas being produced at a prescribed pressure by contact with waste heat fluid.

6 Claims, 4 Drawing Sheets

METHOD AND APPARATUS USING HYDROGEN-OCCLUDED ALLOY FOR RECOVERING POWER FROM WASTE HEAT

BACKGROUND OF THE INVENTION

1. Field of the Invention

This invention relates to a method and apparatus that uses hydrogen-occluded alloy for recovering power from waste heat, and more particularly to a method and apparatus for recovering power from waste heat that uses hydrogen gas and heat emitted from hydrogen-occluded alloy to drive a turbine to generate power.

2. Description of the Prior Art

There are known hydrogen-occluded alloys such as lanthanum nickel that occlude large quantities of hydrogen. Because small amounts of such alloys are able to occlude large quantities of hydrogen, they are being utilized in various fields of technology.

JP-A-4-295108 discloses an example of a method of generating power by heating a hydrogen-occluded alloy and using the hydrogen gas emitted from the alloy to drive a turbine.

A waste heat recovery power generation apparatus according to the above disclosure uses a two-stage hydrogen-occluded alloy configuration for heat recovery. More specifically, while each alloy stage is connected to a turbine for power generation, there is a difference in the pressure of the hydrogen gas generated at each stage, and as the hydrogen gas is delivered on an alternating basis from one apparatus set, the output varies with time. Moreover, since turbine output decreases relatively for each stage, and since the efficiency of the turbine decreases in proportion to approximately half the square of the output, the output is also affected by the time-based variation, resulting in a decrease in the average output.

Various recovery systems have been proposed in which waste heat is used as the heat source in a low-temperature Rankine cycle that is used to drive the power generation turbine.

However, when this type of conventional low-temperature Rankine cycle system uses a waste heat temperature below about 100° C., the small temperature differential between the heat source and the atmosphere means that the condenser has to be larger, making the overall system relatively large and costly. This results in a higher unit generating cost that makes such systems impractical.

There are examples of hydrogen-occluded alloy based waste heat recovery apparatuses being used as heat pumps or thermal generators. However, owing to the fact that the use of hydrogen-occluded alloy increases the heat capacity of such apparatuses and results in a low efficiency of no more than around 40% of the ideal cycle, such apparatuses have not been applied to power generation or power recovery. A further factor has been the shortcomings of various ideas put forward for achieving high-performance cycles.

An object of the present invention is to provide a method and apparatus for recovering more power from waste heat with improved efficiency and low variation in amount of power generated.

SUMMARY OF THE INVENTION

In accordance with this invention, the above object is attained by a method of recovering power from waste heat using a hydrogen-occluded alloy, the method comprising continuous recovery of heat energy from waste heat fluid by repetition of a process comprising, introducing waste heat fluid into a first heat exchanger to heat hydrogen-occluded alloy contained in the first heat exchanger and produce hydrogen gas at a prescribed pressure, the hydrogen-occluded alloy being constituted as a multiplicity of stages having an alloy composition selected so that a decrease in waste heat fluid temperature is not accompanied by a decrease in hydrogen gas pressure, introducing the hydrogen gas thus produced into a hydrogen gas turbine to drive the turbine and drive a power generator associated with the turbine, introducing cooling fluid into a second heat exchanger to cool hydrogen-occluded alloy contained in the second heat exchanger, the hydrogen-occluded alloy being constituted as a multiplicity of stages having an alloy composition selected so that a decrease in waste heat fluid temperature is not accompanied by a decrease in hydrogen gas pressure, introducing the hydrogen gas used to drive the gas turbine into the second heat exchanger for occlusion by the cooled alloy, operating a selector valve when hydrogen gas remaining after occlusion by the alloy in the first heat exchanger reaches a prescribed quantity to introduce waste heat fluid into the second heat exchanger and supply the first heat exchanger with cooling fluid, introducing into the turbine hydrogen gas produced at a prescribed pressure by heating of the hydrogen-occluded alloy in the second heat exchanger by the waste heat fluid thus introduced to drive the power generator, introducing hydrogen gas discharged from the gas turbine into the first heat exchanger for occlusion by the alloy therein, and operating the selector valve when hydrogen gas remaining after occlusion by the alloy in the second heat exchanger reaches a prescribed quantity to introduce waste heat fluid into the first heat exchanger and supply the second heat exchanger with cooling fluid.

The above object is also attained by an apparatus using hydrogen-occluded alloy for recovering power from waste heat, the apparatus comprising: first and second heat exchangers containing hydrogen-occluded alloy, the hydrogen-occluded alloy being constituted as a multiplicity of alloys having different hydrogen gas discharge temperatures, a waste heat fluid line for introducing waste heat fluid into the first and second heat exchangers and discharging waste heat fluid therefrom, a first selector valve for alternating introduction of waste heat fluid between the first and second heat exchangers, a cooling fluid line for introducing cooling fluid into the first and second heat exchangers and discharging cooling fluid therefrom, a second selector valve for alternating introduction of cooling fluid between the first and second heat exchangers, a turbine that is driven by entry of hydrogen gas and drives a power generator associated with the turbine, a first hydrogen gas circulation line communicating the first and second heat exchangers with a high-pressure side of the turbine, a second hydrogen gas circulation line communicating the first and second heat exchangers with a low-pressure side of the turbine, a third selector valve disposed in the first hydrogen gas circulation line, a fourth selector valve disposed in the second hydrogen gas circulation line, and a control apparatus for controlling selection operation of the first to fourth selector valves, the control apparatus controlling selector valve operation for repeatedly alternating between a first process comprising introducing waste heat fluid into the first heat exchanger, introducing cooling fluid into the second heat exchanger, introducing hydrogen gas produced in the first heat exchanger into the high-pressure side of the turbine and introducing hydrogen gas discharged from the turbine into the second heat exchanger, and a second process comprising introducing waste heat fluid into the second heat exchanger, introducing cooling fluid into the first heat exchanger, introducing hydrogen gas produced in the second heat exchanger into the high-pressure side of the turbine and introducing hydrogen gas discharged from the turbine into the first heat exchanger.

This invention also includes generating power by supplying hydrogen gas produced at a prescribed pressure by a first or second heat exchanger to a third or fourth heat exchanger containing hydrogen-occluded alloy, heating the alloy by further hydrogen occlusion, using a heat transfer medium to supply this heat to a vaporization heat exchanger to vaporize fluid in the heat exchanger, and using the vaporized medium to drive a turbine and thereby drive a generator associated with the turbine.

By providing the heat exchangers with occlusion alloys configured as a multiplicity of stages having different hydrogen gas discharge temperatures, while there may be a gradual reduction in the temperature of the waste heat fluid through contact with the alloys, generation of hydrogen gas of a prescribed pressure can be maintained, reducing variation in output characteristics and improving the efficiency of waste heat recovery.

The waste heat fluid can also be heated to a higher temperature and used, enabling the amount of power generated to be increased.

Further features of the invention, its nature and various advantages will be more apparent from the accompanying drawings and following detailed description of the invention.

DESCRIPTION OF THE PREFERRED EMBODIMENT

Figure 1:
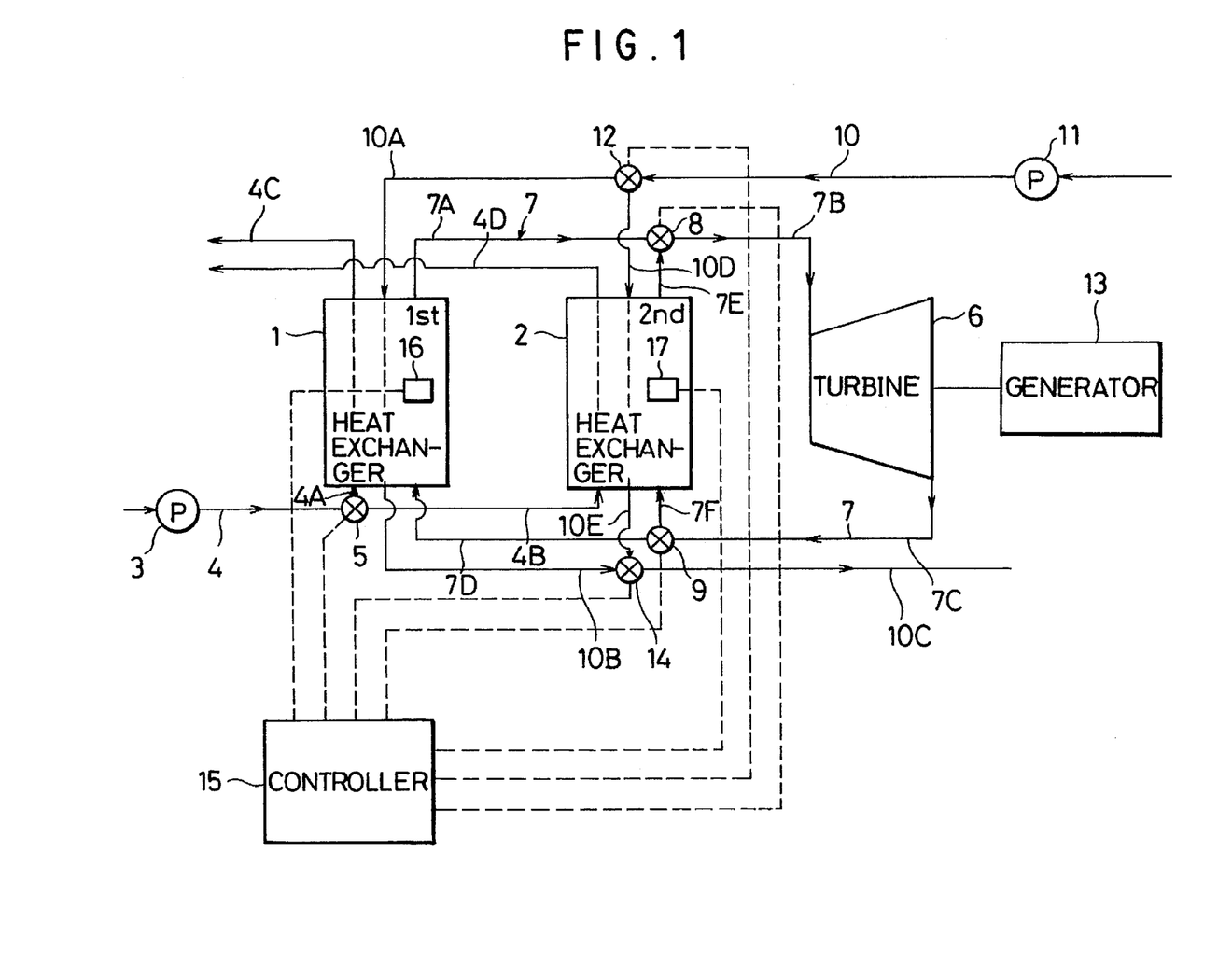
FIG. 1 shows the configuration of a first embodiment of an apparatus for recovering power from waste heat, according to the invention.
Figure 2:
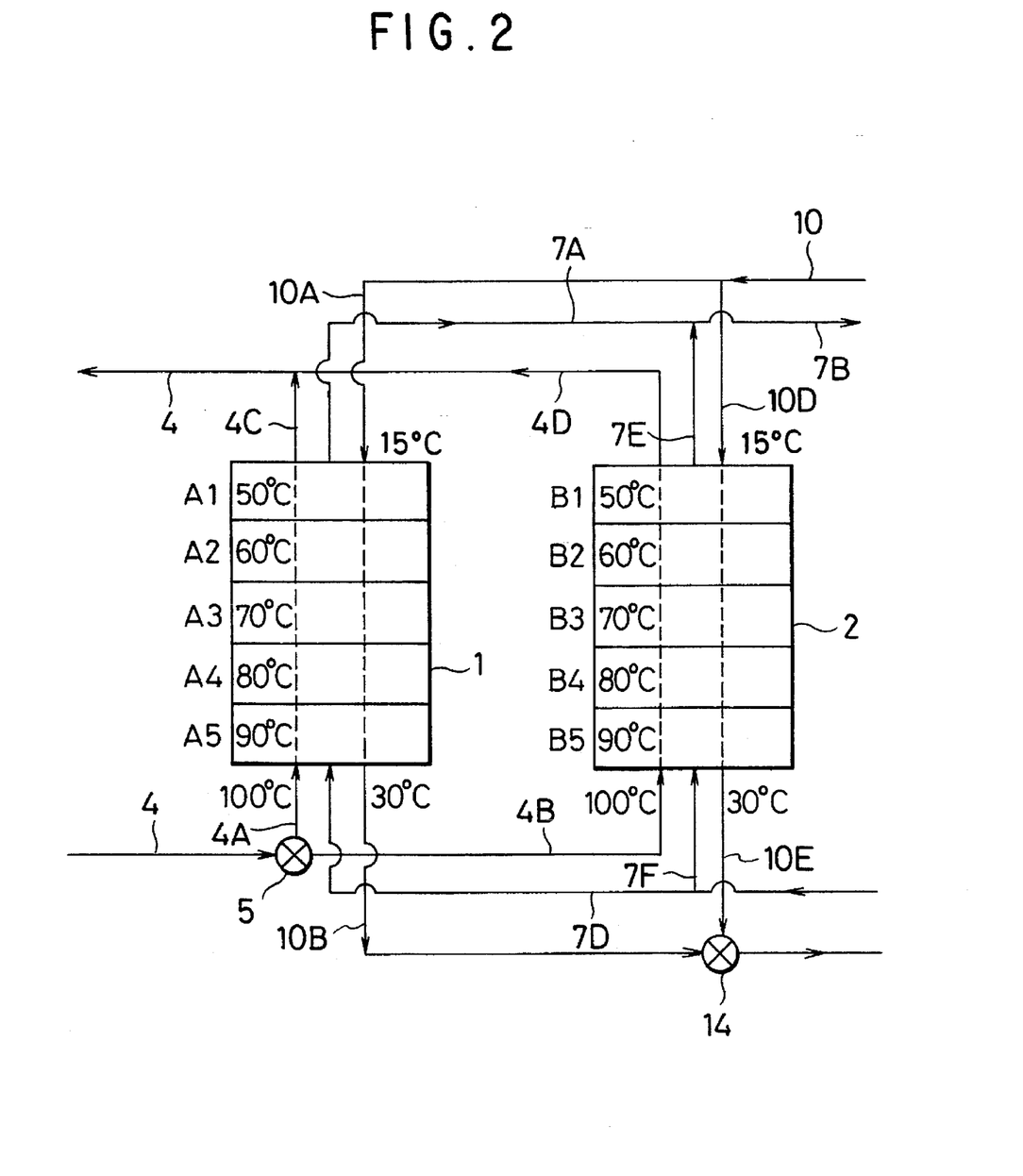
FIG. 2 illustrates an example of an arrangement of hydrogen-occluded alloys in a heat exchanger in the apparatus of FIG. 1.
Figure 3:
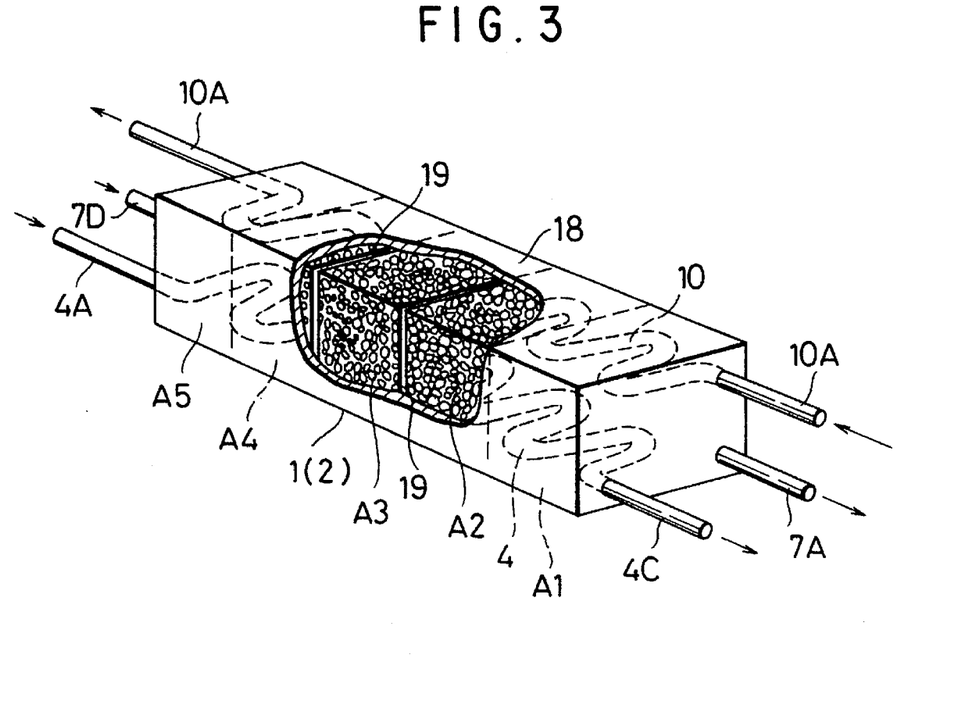
FIG. 3 is a partially cutaway perspective view of the heat exchanger of FIG. 2.

FIGS. 1 to 3 show the configuration of an apparatus that uses hydrogen-occluded alloy for recovering power from waste heat according to a first embodiment of the present invention.

The illustrated apparatus includes first and second heat exchangers 1 and 2 each containing hydrogen-occluded alloy. The heat exchangers 1 and 2 are provided with a waste heat pump 3 for circulating waste heat fluids (waste water, waste gas and the like having an elevated temperature). A waste heat fluid line 4 has a selector valve 5 that is used to select either a waste heat fluid line 4A going to the first heat exchanger 1 or a waste heat fluid line 4B going to the second heat exchanger 2. When waste heat fluid line 4A is selected, waste heat fluid flows into the first heat exchanger 1 via the waste heat fluid line 4A, imparts heat to the hydrogen-occluded alloy inside the first heat exchanger 1 and flows out via a waste heat fluid line 4C.

When waste heat fluid line 4B is selected, waste heat fluid flows into the second heat exchanger 2 via the waste heat fluid line 4B, imparts heat to the hydrogen-occluded alloy inside the second heat exchanger 2 and flows out via a waste heat fluid line 4D.

Hydrogen gas emitted from the hydrogen-occluded alloy provided in the first and second heat exchangers 1 and 2 is fed to the high-pressure side of a turbine 6. The hydrogen gas discharged from the low-pressure of the turbine 6 is fed back to the first and second heat exchangers 1 and 2 through a hydrogen gas circulation line 7 that has two selector valves 8 and 9. Selector valve 8 is for selecting whether the hydrogen gas from the first heat exchanger 1 or the second heat exchanger 2 is directed to the high-pressure side of the turbine 6. Selector valve 9 is for selecting whether the hydrogen gas discharged from the low-pressure of the turbine 6 is directed to the first heat exchanger 1 or the second heat exchanger 2.

High-pressure hydrogen gas from the first heat exchanger 1 flows to the high-pressure side of the turbine 6 via a hydrogen gas circulation line 7A, selector valve 8 and hydrogen gas circulation line 7B. In the turbine 6 the hydrogen gas expands, and the hydrogen gas thus depressurized to a low-pressure gas flows, via a hydrogen gas circulation line 7C, selector valve 9 and hydrogen gas circulation line 7D, to the second heat exchanger 2, where it is occluded by the hydrogen-occluded alloy in the second heat exchanger 2.

High-pressure hydrogen gas generated by the second heat exchanger 2 flows to the high-pressure side of the turbine 6 via a hydrogen gas circulation line 7E, selector valve 8 and hydrogen gas circulation line 7B. In the turbine 6 the hydrogen gas expands, and the hydrogen gas thus depressurized to a low-pressure gas flows, via hydrogen gas circulation line 7C, selector valve 9 and hydrogen gas circulation line 7F, to the first heat exchanger 1, where it is occluded by the hydrogen-occluded alloy in the first heat exchanger 1.

A cooling water line 10 and coolant pump 11 are provided to run cooling water through the first and second heat exchangers 1 and 2 to cool the hydrogen-occluded alloy inside the heat exchangers. The cooling water line 10 has a selector valve 12 for selecting whether cooling water is routed to the first heat exchanger 1 or the second heat exchanger 2.

In the former case the cooling water pumped by the coolant pump 11 is discharged after passing through the cooling water line 10, selector valve 12, cooling water line 10A, first heat exchanger 1, cooling water line 10B and cooling water line 10C.

In the latter case the cooling water pumped by the coolant pump 11 is discharged after passing through the cooling water line 10, selector valve 12, cooling water line 10D, second heat exchanger 2, cooling water line 10E and cooling water line 10C.

Although in the illustrated embodiment a selector valve 14 is provided at the point of confluence between cooling water lines 10B and 10C, this valve 14 may be omitted.

A generator 13 is linked to the turbine 6 so that power is generated when the turbine 6 is driven.

Operation of the selector valves 5, 8, 9, 12 and 14 is controlled by signals from a controller 15.

The first and second heat exchangers 1 and 2 are also provided with pressure sensors 16 and 17. Depending on the pressure detected by the pressure sensors 16 and 17, the controller 15 outputs selection signals to operate the selector valves 5, 8, 9, 12 and 14.

The operation of the power generation apparatus thus configured will now be described.

First, the controller 15 is used to switch the selector valves 5, 8, 9, 12 and 14 to a first process side for operation of the first heat exchanger 1.

When this is done, waste heat fluid is pumped by the waste heat pump 3 through the waste heat fluid line 4, selector valve 5 and waste heat fluid line 4A to the first heat exchanger 1, where it heats (undergoes heat exchange with) the hydrogen-occluded alloy in the first heat exchanger 1 and is then discharged via waste heat fluid line 4C. The hydrogen-occluded alloy thus heated releases the occluded hydrogen gas.

The high-pressure hydrogen gas thus produced in the first heat exchanger 1 flows into the turbine 6 via hydrogen gas circulation line 7A, selector valve 8 and hydrogen gas circulation line 7B, thereby driving the turbine 6. As generator 13 is connected to the turbine 6, power generated by the rotation of the turbine 6.

Low-pressure hydrogen gas discharged from the turbine 6 passes through hydrogen gas circulation line 7C, selector valve 9 and hydrogen gas circulation line 7F and into the second heat exchanger 2.

Since cooling water pumped through the second heat exchanger 2 by the coolant pump 11 cools the hydrogen-occluded alloy in the second heat exchanger 2, the hydrogen-occluded alloy is in a state in which it can occlude a large quantity of hydrogen. Thus, hydrogen gas introduced into the second heat exchanger 2 via the hydrogen gas circulation line 7F is occluded by the cooled hydrogen-occluded alloy.

When a prescribed quantity of hydrogen gas has been released by the hydrogen-occluded alloy in the first heat exchanger 1, the pressure in the first heat exchanger 1 drops. This change in the internal pressure is detected by the pressure sensor 16, which outputs a signal to the controller 15 to switch the selector valves 5, 8, 9, 12 and 14. Doing this switches over to a second process side for operation of the second heat exchanger 2, and causes the first heat exchanger 1 to be cooled by water pumped by the coolant pump 11 into the first heat exchanger 1 via cooling line 10A.

The system operation of the second heat exchanger 2 will now be described.

Waste heat fluid is pumped by the waste heat pump 3 through the waste heat fluid line 4, selector valve 5 and waste heat fluid line 4B to the second heat exchanger 2, thereby imparting heat to the hydrogen-occluded alloy in the second heat exchanger 2, and is then discharged through waste heat fluid line 4D. The hydrogen-occluded alloy thus heated releases the occluded hydrogen gas.

The high-pressure hydrogen gas thus produced in the second heat exchanger 2 flows into the turbine 6 via hydrogen gas circulation line 7E, selector valve 8 and hydrogen gas circulation line 7B; the expansion of the gas in the turbine 6 drives the turbine 6. Hydrogen gas discharged from the turbine 6 passes through hydrogen gas circulation line 7C, selector valve 9 and hydrogen gas circulation line 7D and into the first heat exchanger 1.

The cooling water introduced into the second heat exchanger 2 cools the hydrogen-occluded alloy in the second heat exchanger 2 so that the hydrogen-occluded alloy is in a state in which it can occlude a large quantity of hydrogen. Thus, the hydrogen gas introduced into the first heat exchanger 1 via the hydrogen gas circulation line 7D is occluded by the cooled hydrogen-occluded alloy.

When a prescribed quantity of hydrogen gas has been released by the hydrogen-occluded alloy in the second heat exchanger 2, the pressure in the second heat exchanger 2 drops. This change in the internal pressure is detected by the pressure sensor 17, which outputs a signal to the controller 15 to again switch the selector valves 5, 8, 9, 12 and 14 to the first process side for another operation of the first heat exchanger 1, and cause the second heat exchanger 2 to be cooled.

Power is generated on a continuous basis by repeatedly alternating the first process using the first heat exchanger 1 with the second process using the second heat exchanger 2.

In accordance with this invention, hydrogen-occluded alloy is heated to a prescribed temperature by waste heat fluid to extract occluded hydrogen gas at a prescribed high pressure (for example 10 atm). This gas is used to drive a turbine, whereby the pressure of the gas is decreased (to 10 atm, for example), and this low-pressure hydrogen gas is then occluded using another hydrogen-occluded alloy.

There is a difference between the temperature of the waste heat fluid when it enters the heat exchangers 1 and 2 and the temperature when it exits (for example, an entry temperature of 100° C. compared to an exit temperature of 50° C.). As such, it is desirable to use an alloy arrangement that effectively produces hydrogen gas at a pressure of 10 atm, such as by disposing on the inlet side of the heat exchangers an alloy that at around 100° C. generates a hydrogen gas pressure of 10 atm at a temperature that is lower with each alloy, ending at the outlet side with an alloy that generates hydrogen gas at 10 atm at a temperature or around 50° C.

Thus, in accordance with this invention, as shown in FIG. 2, a series of alloys A1 to A5 are disposed in the first heat exchanger 1, with alloy A5 at the inlet end and alloy A1 at the outlet end, with A5 being an alloy that produces hydrogen gas at 10 atm at a temperature of around 95° C., A4 being an alloy that produces hydrogen gas at the same pressure of 10 atm at around 85° C., A3 being an alloy that produces hydrogen gas at 10 atm at around 65° C., A2 being an alloy that produces the gas at 10 atm at around 60° C., and A1, at the outlet end, being an alloy that produces the gas at 10 atm at around 50° C. In the second heat exchanger 2, a similar arrangement of alloys B5 (at the inlet end), B4, B3, B2 and B1 (at the outlet end) is used that produce hydrogen gas at 10 atm at respective temperatures of 95° C., 85° C., 75° C., 65° C. and 55° C.

Examples of occlusion alloys that can be used to produce hydrogen gas at 10 atm include $Ti_{0.6}Zr_{0.4}Mn_{1.9}Cu_{0.1}$ at temperatures up to 95° C., $Ti_{0.8}Zr_{0.2}Mn_{1.7}$ at up to 75° C., and $Ti_{0.8}Zr_{0.2}Mn_{1.8}Mo_{0.2}$ at up to 55° C. Alloys for producing hydrogen gas at 10 atm at 85° C. and 65° C. can be formed by appropriately adjusting the above alloy composition ratios.

Thus using in the heat exchangers 1 and 2 multiplicities of alloys having different hydrogen release temperatures enables the pressure of the hydrogen gas generated in the heat exchangers to be maintained at a prescribed value even though the heat exchange process gradually lowers the temperature of the waste heat fluid.

The above-described embodiment is for obtaining hydrogen gas at 10 atm using a waste heat fluid temperature of around 100° C. Alloy composition and the number of alloy stages will vary depending on the waste heat fluid temperature, generated hydrogen gas pressure and other such conditions.

FIG. 3 shows an example of a specific configuration for the first and second heat exchangers 1 and 2. Mesh dividers 19 are used to dived the interior of a sealed vessel 18 into five chambers, which are filled with particles of hydrogen-occluded alloys A5, A4, A3 and A2 that each releases hydrogen gas at a prescribed pressure at an elevated temperature that is highest at the upstream (A5) end and lowest at the downstream (A1) end.

Inside the sealed vessel 18 the waste heat fluid line 4 and cooling water line 10 are arranged in a back-and-forth configuration for effective heat exchange. The sealed vessel 18 has a hydrogen gas input line 7D at the upstream end and a high-pressure hydrogen gas discharge line 7A at the downstream end.

The alloy particles produce hydrogen gas at a prescribed pressure when they are heated by waste heat fluid entering the vessel through line 4A, and the gas is circulated to the turbine via line 7A.

Waste heat fluids produced by a factory are usually around 100° C. or below. However, the present invention can also be used to generate power using waste heat fluids having a low temperature of below zero, such as LNG, which conventionally are usually discarded.

Figure 4:
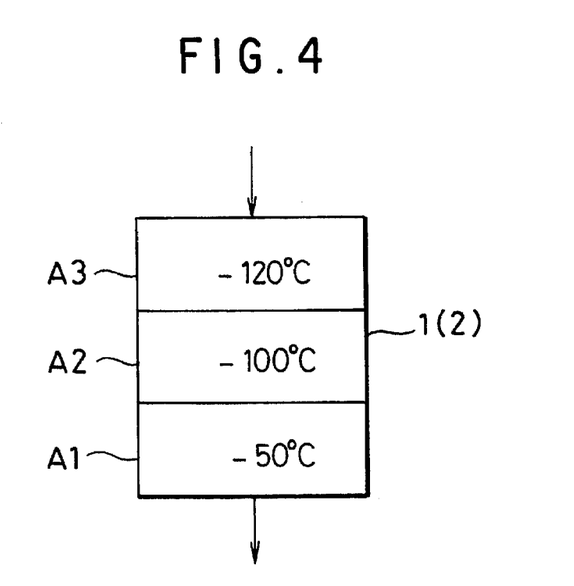
FIG. 4 illustrates an example of another arrangement for the hydrogen-occluded alloys in a heat exchanger.

FIG. 4 shows a heat exchanger using waste heat fluid at −120° C. Arranged inside the first heat exchanger 1 (2) are hydrogen-occluded alloys that, at −120° C. and −100° C., from the upstream end, release the occluded hydrogen at 1 atm and at 10°–25° C. release the hydrogen at 10 atm, and in the case of the alloy at the downstream end, at −50° C. releases the hydrogen at 1 atm and at 10°–25° C. releases the hydrogen at 10 atm.

Examples of occlusion alloys that can be used include $TiMn_{0.6}Cr_{0.9}$ as an alloy for producing hydrogen gas at 1 atm at −120° C., $Ti_{0.9}Zr_{0.1}Mn_{1.4}Cr_{0.4}V_{0.2}$ as an alloy for producing hydrogen gas at 1 atm at −100° C., and $TiMn_{1.5}$ as an alloy for producing hydrogen gas at that pressure at −50° C.

When waste gas at −120° C. is introduced into the first heat exchanger 1, alloy A3 is cooled to −120° C. and occludes hydrogen gas at 1 atm. Heat exchange with the alloy A3 brings the waste gas to −100° C., and on contact with alloy A2, A2 is cooled to around −50° C., at which temperature it occludes the hydrogen gas at 1 atm. Near the outlet end the waste gas is at a temperature of around −50° C., and through contact with the gas at that temperature, alloy A1 is cooled to around −50° C., at which temperature it occludes the hydrogen gas at 1 atm. At a normal temperature of around 10° to 25° C., each of the alloys releases hydrogen gas at 10 atm.

Thus using a plurality of alloys that release the hydrogen gas at different temperatures enables different pressures of 10 atm and 1 atm to be readily produced, and this pressure differential can be utilized for stable operation of the turbine.

With respect to cooling of the alloys by introducing cooling fluid into the heat exchangers 1 and 2, since the coolant flow rate can be selected with relative freedom, the temperatures inside the heat exchangers 1 and 2 can easily be controlled to, for example, 25° C. at the inlet to 30° C. at the outlet.

Controlling the internal pressure of the heat exchangers 1 and 2 to the pressure of the hydrogen gas (1 atm, for example) when the above five alloy stages A1 to A5 and B1 to B5 are maintained at 15° C. to 30° C. enables an energy recovery cycle to be obtained using the expansion of the hydrogen gas that takes place when the pressure changes from 10 atm to 1 atm.

In addition to using the 10 atm and 1 atm hydrogen gas thus produced for turbine power generation, the pressure differential can be used to further increase the waste heat temperature, and the temperature differential between the resultant high heat energy and the atmosphere utilized for power generation.

This type of heat pump type power generation apparatus will now be described with reference to FIG. 5.

Figure 5:
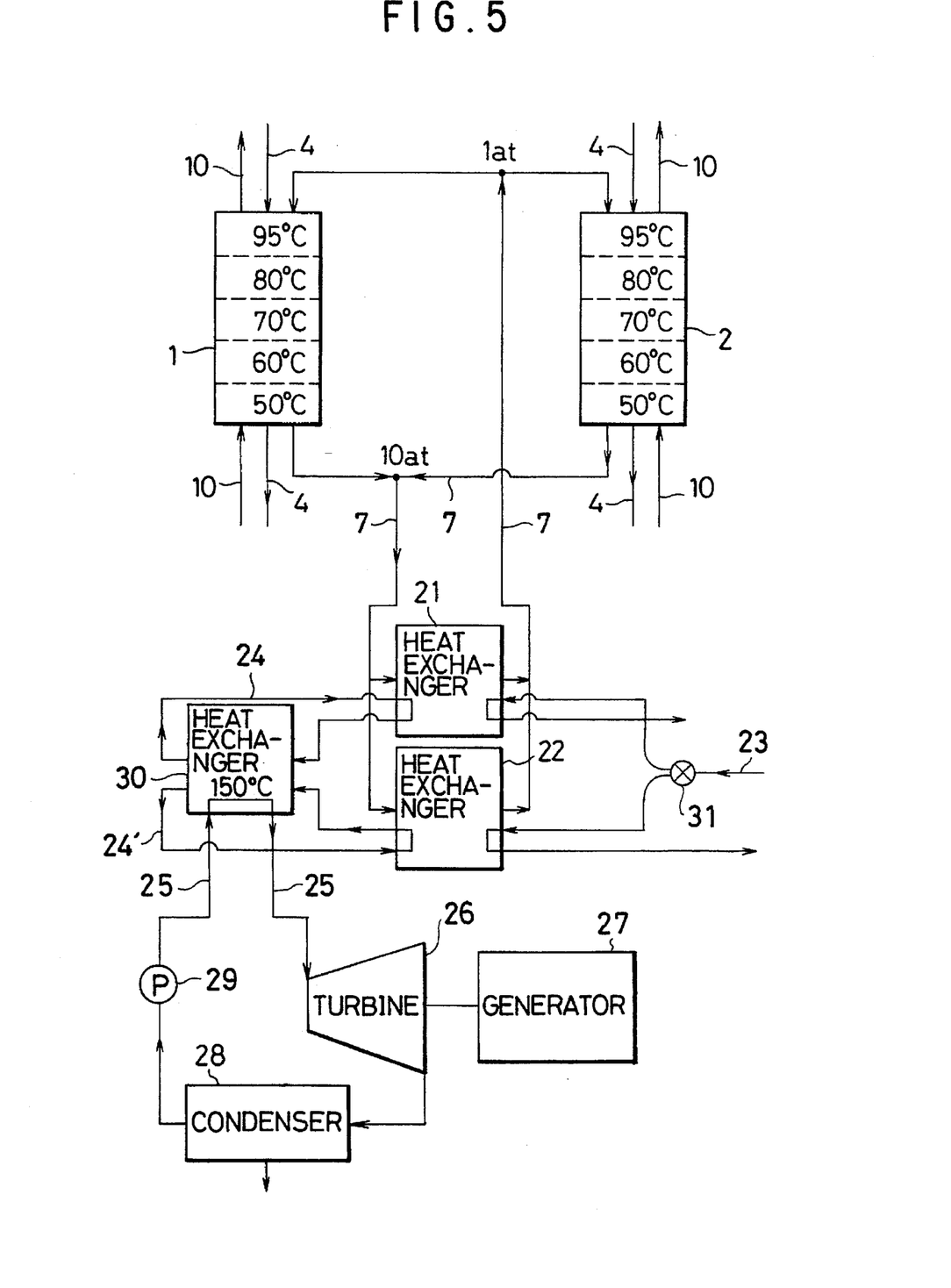
FIG. 5 shows the configuration of a second embodiment of an apparatus for recovering power from waste heat, according to the invention.

In addition to first and second heat exchangers 1 and 2, the apparatus of FIG. 5 includes third and fourth heat exchangers 21 and 22 connected to hydrogen gas circulation lines 7 of heat exchangers 1 and 2. The heat exchangers 21 and 22 contain alloy, for example $TiO_{0.3}$, $ZrO_{0.7}$, $Mn_{0.2}$ that at around 95° C. occlude hydrogen at 1 atm.

When waste heat fluid is supplied to the first heat exchanger 1, hydrogen gas is discharged from the heat exchanger 1 at 10 atm and passes through line 7 and a selector valve to the heat exchanger 21. Factory waste heat fluid 23 at a temperature of 95° C. is supplied via selector valve 31 to the alloy in the heat exchanger 21, which occludes hydrogen at 1 atm. When hydrogen is supplied from the first heat exchanger 1 at 10 atm, occlusion of the hydrogen gas by the alloy in the heat exchanger 21 starts, releasing heat that raises the temperature in the heat exchanger 21 to around 150° C. The heat exchanger 21 includes a line 24 in which flows a heat transfer medium such as oil or water. With the heat transfer medium thus heated to around 150° C., an organic heating medium flowing in a flowline 25 is vaporized in a vaporization heat exchanger 30 and the high-pressure vaporized medium is fed to a turbine 26, driving the turbine 26 and thereby generating power by driving, at a prescribed speed, a generator 27 connected to the turbine 26. As a result of heat from the heat transfer medium, the pressure of the hydrogen gas in the fourth heat exchanger 22 goes to 1 atm and the gas is emitted through line 7 and occluded by the alloy in heat exchanger 2.

The heat transfer medium discharged from the turbine 26 is cooled to around 20° C. and condensed by a condenser 28, and is then circulated back to the vaporization heat exchanger 30 by pump 29.

When the pressure of hydrogen gas from the first heat exchanger 1 falls below 10 atm, a selector valve is operated to direct waste heat fluid to the second heat exchanger 2, starting a release of hydrogen at a pressure of 10 atm from the hydrogen-occluded alloy. This high-pressure hydrogen is sent to the fourth heat exchanger 22. The waste heat fluid 23 causes the alloy in the heat exchanger 22 to occlude hydrogen at 1 atm. Occlusion starts when the hydrogen-occluded alloy contacts hydrogen at 10 atm, and as a result of the heat of the occlusion process the temperature in the fourth heat exchanger 22 rises to around 150° C. The heat transfer medium thus heated to around 150° C. vaporizes an organic heating medium flowing through the flowline 25 in the vaporization heat exchanger 30, and the resulting high-pressure medium vapor is sent to the turbine 26, driving the turbine 26.

Hydrogen gas from the second heat exchanger 2 is occluded by the alloy in the fourth heat exchanger 22.

After passing through the turbine 26 the vaporized medium is cooled to around 20° C. and condensed by a condenser 28, and is then circulated back to the vaporization heat exchanger 30 by the pump 29.

Thus, as described in the foregoing, one of the heat exchangers 21 and 22 is heated to around 150° C. when it is supplied with hydrogen gas at a pressure of 10 arm while in the other heat exchanger the temperature becomes 95° C. Hydrogen gas is therefore produced on an alternating basis, which makes it possible to minimize variation in turbine output and amount of power generated.

Since in accordance with this invention, as shown by the above description, the heat exchangers are provided with a plurality of hydrogen-occluded alloy stages that each emit hydrogen gas at a different temperature, although the temperature of the waste heat fluid contacting the alloy stages may change, the pressure generated by the hydrogen gas does not change. This enables effective energy recovery and also makes it possible to reduce time-based variation of generated power.

With this invention it is also possible to produce a hydrogen gas pressure differential using low-temperature waste heat fluid such as LNG, for example.

Low-temperature waste heat fluids can be easily heated and the higher-temperature waste heat fluid then used to generate power improved efficiency and economy.

What is claimed is:

1. A method of recovering power from waste heat using a hydrogen-occluded alloy, the method comprising continuous recovery of heat energy from waste heat fluid by repetition of a process comprising:

introducing waste heat fluid into a first heat exchanger to heat hydrogen-occluded alloy contained in the first heat exchanger and produce hydrogen gas at a prescribed pressure, the hydrogen-occluded alloy being constituted as a multiplicity of stages having an alloy composition selected so that a decrease in waste heat fluid temperature is not accompanied by a decrease in hydrogen gas pressure, introducing the hydrogen gas thus produced into a hydrogen gas turbine to drive the turbine and drive a power generator associated with the turbine, introducing cooling fluid into a second heat exchanger to cool hydrogen-occluded alloy contained in the second heat exchanger, the hydrogen-occluded alloy being constituted as a multiplicity of stages having an alloy composition selected so that a decrease in waste heat fluid temperature is not accompanied by a decrease in hydrogen gas pressure, introducing the hydrogen gas used to drive the gas turbine into the second heat exchanger for occlusion by the cooled alloy, operating a selector valve when hydrogen gas remaining after occlusion by the alloy in the first heat exchanger reaches a prescribed quantity to introduce waste heat fluid into the second heat exchanger and supply the first heat exchanger with cooling fluid, introducing into the turbine hydrogen gas produced at a prescribed pressure by heating of the hydrogen-occluded alloy in the second heat exchanger by the waste heat fluid thus introduced to drive the power generator, introducing hydrogen gas discharged from the gas turbine into the first heat exchanger for occlusion by the alloy therein, and operating the selector valve when hydrogen gas remaining after occlusion by the alloy in the second heat exchanger reaches a prescribed quantity to introduce waste heat fluid into the first heat exchanger and supply the second heat exchanger with cooling fluid.

2. An apparatus using hydrogen-occluded alloy for recovering power from waste heat, the apparatus comprising: first and second heat exchangers containing hydrogen-occluded alloy, the hydrogen-occluded alloy being constituted as a multiplicity of alloys having different hydrogen gas discharge temperatures, a waste heat fluid line for introducing waste heat fluid into the first and second heat exchangers and discharging waste heat fluid therefrom, a first selector valve for alternating introduction of waste heat fluid between the first and second heat exchangers, a cooling fluid line for introducing cooling fluid into the first and second heat exchangers and discharging cooling fluid therefrom, a second selector valve for alternating introduction of cooling fluid between the first and second heat exchangers, a turbine that is driven by entry of hydrogen gas and drives a power generator associated with the turbine, a first hydrogen gas circulation line communicating the first and second heat exchangers with a high-pressure side of the turbine, a second hydrogen gas circulation line communicating the first and second heat exchangers with a low-pressure side of the turbine, a third selector valve disposed in the first hydrogen gas circulation line, a fourth selector valve disposed in the second hydrogen gas circulation line, and a control apparatus for controlling selection operation of the first to fourth selector valves, the control apparatus controlling selector valve operation for repeatedly alternating between a first process comprising introducing waste heat fluid into the first heat exchanger, introducing cooling fluid into the second heat exchanger, introducing hydrogen gas produced in the first heat exchanger into the high-pressure side of the turbine and introducing hydrogen gas discharged from the turbine into the second heat exchanger, and a second process comprising introducing waste heat fluid into the second heat exchanger, introducing cooling fluid into the first heat exchanger, introducing hydrogen gas produced in the second heat exchanger into the high-pressure side of the turbine and introducing hydrogen gas discharged from the turbine into the first heat exchanger.

3. A method of recovering power from waste heat using a hydrogen-occluded alloy, the method comprising continuous recovery of heat energy from waste heat fluid by repetition of a process comprising:

introducing waste heat fluid into a first heat exchanger to heat hydrogen-occluded alloy contained in the first heat exchanger and produce hydrogen gas at a prescribed pressure, supplying the hydrogen gas produced at the prescribed pressure to a third heat exchanger containing alloy that has occluded hydrogen from waste heat fluid supplied at a prescribed temperature for hydrogen occlusion by the alloy, thereby elevating an internal temperature of the third heat exchanger, using a heat exchange medium to supply heat from the third heat exchanger to a vaporization heat exchanger to vaporize fluid in the vaporization heat exchanger, introducing the vaporized fluid into a turbine to drive the turbine and drive a power generator associated with the turbine, operating a selector valve when hydrogen gas remaining after occlusion by the alloy in the first heat exchanger reaches a prescribed quantity to introduce waste heat fluid into a second heat exchangert thereby heating hydrogen-occluded alloy contained in the second heat exchanger and producing hydrogen gas at a prescribed pressure, and to supply the first heat exchanger with cooling fluid, supplying the hydrogen gas produced at the prescribed pressure to a fourth heat exchanger containing alloy that has occluded hydrogen from waste heat fluid supplied at a prescribed temperature for hydrogen occlusion by the alloy, thereby elevating an internal temperature of the fourth heat exchanger, using a heat exchange medium to supply heat from the fourth heat exchanger to the vaporization heat exchanger to vaporize fluid in the vaporization heat exchanger, introducing the vaporized fluid into the turbine to drive the turbine and drive the power generator associated with the turbine, and operating the selector valve when hydrogen gas remaining after occlusion by the alloy in the first heat exchanger reaches a prescribed quantity to introduce waste heat fluid into the first heat exchanger to heat the alloy in the first heat exchanger and produce hydrogen gas at a prescribed pressure, and supplying the second heat exchanger with cooling fluid.

4. A method according to claim 3, wherein hydrogen-occluded alloy in the first and second heat exchangers is constituted as a multiplicity of stages having an alloy composition selected so that a decrease in waste heat fluid temperature is not accompanied by a decrease in hydrogen gas pressure.

5. An apparatus using hydrogen-occluded alloy for recovering power from waste heat, the apparatus comprising:

first and second heat exchangers containing hydrogen-occluded alloy, a first waste heat fluid line for introducing waste heat fluid into the first and second heat exchangers and discharging waste heat fluid therefrom, a first selector valve for alternating introduction of waste heat fluid between the first and second heat exchangers, a cooling fluid line for introducing cooling fluid into the first and second heat exchangers and discharging cooling fluid therefrom, a second selector valve for alternating introduction of cooling fluid between the first and second heat exchangers, a third heat exchanger that contains hydrogenoccluded alloy and is heated by hydrogen gas from the first heat exchanger, a fourth heat exchanger that contains hydrogen-occluded alloy and is heated by hydrogen gas from the second heat exchanger, a second waste heat fluid line for introducing waste heat fluid into the third and fourth heat exchangers, a vaporization heat exchanger that vaporizes fluid using heat from the third and fourth heat exchangers, a turbine that is driven by entry of the vaporized fluid hydrogen gas and drives a power generator associated with the turbine, a first hydrogen gas circulation line that circulates hydrogen gas from the third heat exchanger to the second heat exchanger, a second hydrogen gas circulation line that circulates hydrogen gas from the fourth heat exchanger to the first heat exchanger, and a control apparatus for controlling selection operation of the first and second selector valves.

6. An apparatus according to claim 5, wherein the hydrogen-occluded alloy in the first and second heat exchangers is constituted as a multiplicity of alloys having different hydrogen gas discharge temperatures.

* * * * *